United States Patent [19]

Davenport et al.

[11] Patent Number: 5,675,677
[45] Date of Patent: Oct. 7, 1997

[54] LAMP-TO-LIGHT GUIDE COUPLING ARRANGEMENT FOR AN ELECTRODELESS HIGH INTENSITY DISCHARGE LAMP

[75] Inventors: John M. Davenport, Lyndhurst; Mark E. Duffy, Shaker Heights; Richard L. Hansler, Pepper Pike; Kenneth S. King, Willoughby Hills; William J. Cassarly, Richmond Heights; Thomas G. Parham, Gates Mills; Gary R. Allen, Chesterland; James T. Dakin, Shaker Heights; Frederic F. Ahlgren, Euclid, all of Ohio

[73] Assignee: General Electric Company, Schenectady, N.Y.

[21] Appl. No.: 451,625

[22] Filed: May 26, 1995

Related U.S. Application Data

[63] Continuation of Ser. No. 165,760, Dec. 10, 1993, abandoned.

[51] Int. Cl.$^6$ .................................................. G02B 6/32
[52] U.S. Cl. .................... 385/31; 385/33; 385/39; 385/74; 385/901; 362/32; 315/248
[58] Field of Search ............................ 385/31, 32, 33, 385/36, 39, 74, 146, 901; 315/248, 34, 39, 344; 362/32, 307, 261, 262, 347

[56] References Cited

U.S. PATENT DOCUMENTS

| | | | |
|---|---|---|---|
| 4,002,499 | 1/1977 | Winston | 136/206 |
| 4,810,938 | 3/1989 | Johnson et al. | 315/248 |
| 4,890,042 | 12/1989 | Witting | 315/248 |
| 4,972,120 | 11/1990 | Witting | 313/638 |
| 5,039,903 | 8/1991 | Farrall | 313/160 |
| 5,039,918 | 8/1991 | Ohtake et al. | 315/248 |
| 5,113,121 | 5/1992 | Lapatovich et al. | 315/248 |
| 5,117,312 | 5/1992 | Dolan | 362/32 X |
| 5,140,227 | 8/1992 | Dakin et al. | 315/248 |
| 5,199,091 | 3/1993 | Davenport et al. | 385/39 |
| 5,271,077 | 12/1993 | Brockman et al. | 385/33 X |

*Primary Examiner*—Phan T. H. Palmer
*Attorney, Agent, or Firm*—George E. Hawranko

[57] ABSTRACT

A lamp-to-light guide coupling arrangement includes an electrodeless high intensity discharge lamp comprising an arc tube with an ionizable fill, and an excitation circuit for electrically exciting the ionizable fill to induce therein a light-producing arc discharge. The coupling arrangement further includes a coupling device comprising a generally tubular, hollow body that has an inlet end for receiving light from the arc discharge and a larger, outlet end. The coupling device further comprises an interiorly directed reflector on a surface of the hollow body for reflecting visible light. Such coupling device is shaped so as to receive light at one solid angle over an area of the inlet end and to transmit light at a smaller solid angle but over a larger area of the outlet end. The coupling device is preferably formed from dielectric material. The reflector preferably comprises a refractory optical interference filter.

16 Claims, 5 Drawing Sheets

LAMP-TO-LIGHT GUIDE COUPLING ARRANGEMENT FOR AN ELECTRODELESS HIGH INTENSITY DISCHARGE LAMP

This application is a continuation of application Ser. No. 08/165,760, filed Dec. 10, 1993 now abandoned.

FIELD OF THE INVENTION

The present invention relates to coupling arrangements for receiving light from a lamp and directing such light to a light guide, for distribution to one or more distant locations. More particularly, the invention relates to such a lamp-to-light guide coupling arrangement that is suitable for use with an electrodeless high intensity discharge lamp.

BACKGROUND OF THE INVENTION

Coupling arrangements for receiving light from various types of lamps and directing such light to a light guide are known. An example of such a coupling arrangement can be found in U.S. Pat. No. 5,199,091 issued to Davenport et al on Mar. 30, 1993 and assigned to the same assignee as the present invention. Another example can be found in U.S. patent application Ser. No. 07/859,180 filed on Mar. 27, 1992 now abandoned. However, where a lamp-to-light guide coupling arrangement is for use with an electrodeless high intensity discharge (HID) lamp, special problems are encountered, owing to the nature of such lamps.

An electrodeless HID lamp comprises an arc chamber containing an ionizable fill. The ionizable fill is electrically excited from outside the arc chamber, to induce an arc discharge in the fill. This may be accomplished, for instance, with an excitation coil that encircles the arc tube and generates a radio frequency magnetic field, which, in turn, induces a solenoidal electric field in the ionizable fill. Current flowing in the fill as a result of such solenoidal electric field induces an arc discharge in the fill. For a more detailed description of such a lamp, reference is hereby made to U.S. Pat. No. 4,810,938 issued to P. D. Johnson et al on Mar. 7, 1989 and assigned to the same assignee as the present invention. To prevent the high frequency magnetic field from generating short circuit currents in a lamp-to-light guide coupling arrangement, such arrangement preferably employs dielectric material. Such short circuit currents could potentially destroy the coupling device, or interfere with the foregoing process of exciting the ionizable fill in the arc tube to produce an arc discharge therein.

The arc tube of an electrodeless HID lamp, moreover, typically operates at an elevated temperature, e.g. 900 centigrade. A suitable coupling arrangement should extract light from an arc tube of such lamp with a minimal drain of thermal energy from the lamp. This prevents the lamp from having a significantly asymmetric thermal profile, which would seriously degrade lamp operation.

OBJECTS AND SUMMARY OF THE INVENTION

Accordingly, an object of the invention is to provide a lamp-to-light guide coupling arrangement for an electrodeless HID lamp that preferably employs dielectric material.

Another object is to provide a lamp-to-light guide coupling arrangement for an electrodeless HID lamp wherein light is extracted from the lamp with minimal drain of thermal energy from the lamp, thus preventing the lamp from having a significant asymmetric thermal profile, which would impair the lamp operation and moreover, consequent to avoiding significant thermal energy draw, minimizing potentially destructive heating of the light guide.

In accordance with one form of the invention, a lamp-to-light guide coupling arrangement is provided. The inventive coupling arrangement includes an electrodeless high intensity discharge lamp comprising an arc tube with an ionizable fill, and an excitation means for electrically exciting the ionizable fill to induce therein a light-producing arc discharge. The coupling arrangement further includes a coupling device comprising a generally tubular, hollow body that has an inlet end for receiving light from the arc discharge and a larger, outlet end. The coupling device further comprises an interiorly directed reflector means on a surface of the hollow body for reflecting visible light. The reflector means is shaped so as to receive light at one solid angle over an area of the inlet end and to transmit light at a smaller solid angle but over a larger area of the outlet end. The coupling device is preferably formed from dielectric material, so as avoid short circuit currents therein, and such device only minimally extracts heat from the lamp while extracting the lamp's light.

The foregoing lamp-to-light guide coupling arrangement for an electrodeless HID lamp transmits a substantial portion of the lamp's light to the light guide, in an optically efficient manner.

BRIEF DESCRIPTION OF THE DRAWING FIGURES

The foregoing, and further, objects and advantages of the invention will become apparent from the following description taken in conjunction with the drawing, in which.

DETAILED DESCRIPTION OF THE PREFERRED EMBODIMENTS

Figure 1A:
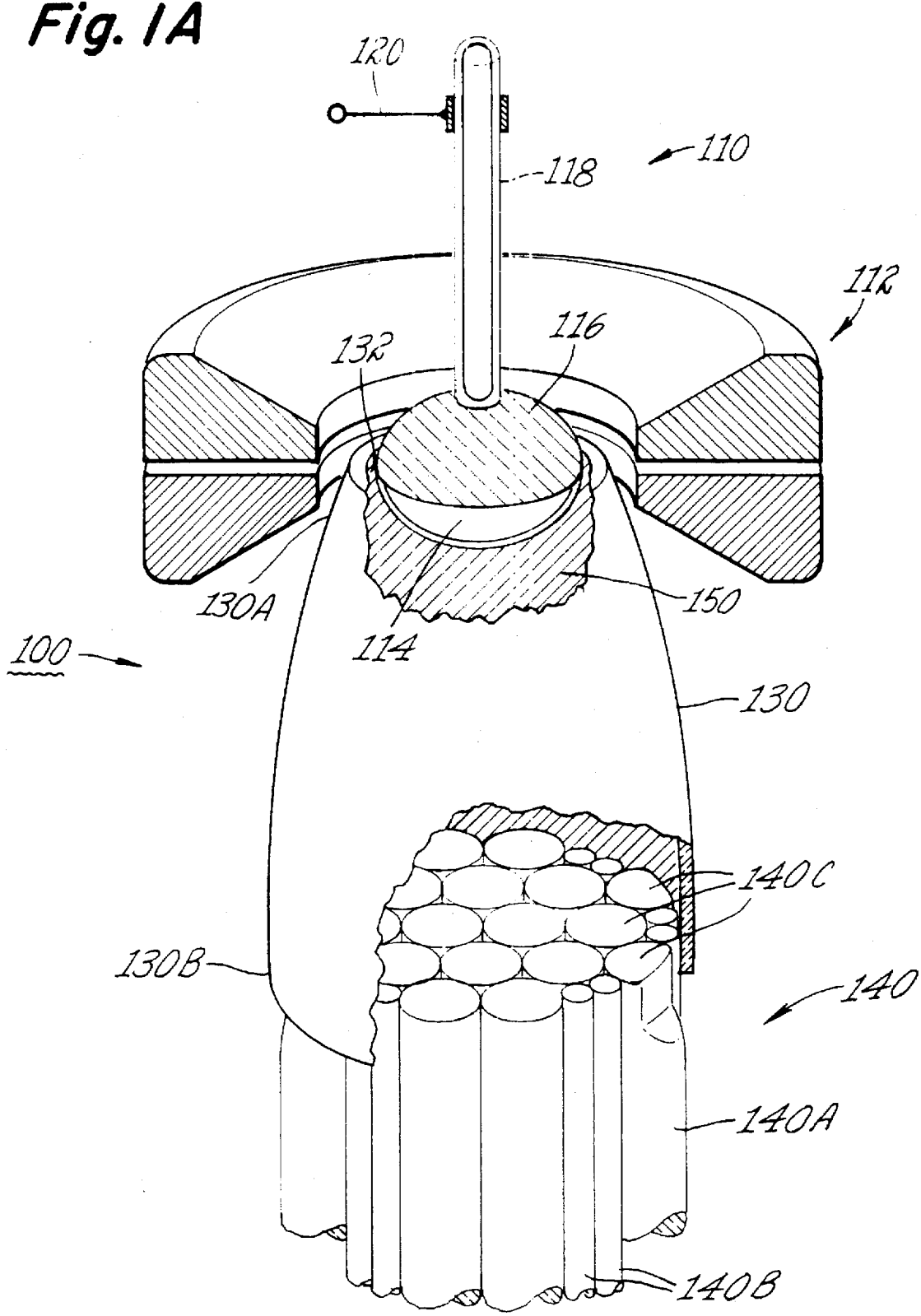
FIG. 1A is a perspective view, partially cut away, of a lamp-to-light guide coupling arrangement for a high intensity discharge (HID) lamp, in accordance with a first embodiment of the invention.

In the drawings figures, in which like reference numerals or characters refer to like parts, FIG. 1A shows a lamp-to-light guide coupling arrangement, generally designated 100. Coupling arrangement 100 includes an electrodeless high intensity discharge (HID) lamp 110 of the type including an excitation coil 112.

Excitation coil 112, shown with two turns, may have the illustrated shape of a volume formed by rotating a bilaterally symmetrical trapezoid about a coil center line situated in the same plane as the trapezoid but which does not intersect the trapezoid. Further details of, and alternatives for, coil shape are set forth, for instance, in U.S. Pat. No. 5,039,903 to G. A. Farrall, issued on Aug. 13, 1991, assigned to the instant assignee, and incorporated herein by reference.

Coil 112 encircles an arc tube 114, whose upper half is covered with an interiorly directed, visible light-reflecting coating 116, shown cross-hatched. (Relative directional terms such as "upper" and "lower" are used herein merely for convenience, and not in a limiting sense.) The lower half of arc tube 114 is substantially free of coating 116 in the embodiment shown. Visible light-reflecting coating 116 may, however, cover more or less of arc tube 114; the precise extent covered is governed by the optical consideration of extracting maximum light from arc tube 114 without interfering with operation of HID lamp 110, and will be routine to those skilled in the art.

Coating 116, formed as described above, is refractory, and thus able to withstand the high temperatures encountered during operation of HID lamp 110. In contrast, a metal coating (e.g. aluminum or silver) would fail under such operating temperatures. Coating 116, formed as described above, is also a dielectric, and thus avoids becoming short circuited during, and interfering with, the above-described electromagnetic process of exciting the ionizable fill in the arc tube to produce an arc discharge therein.

Coating 116, when comprising an optical interference filter, can be designed to selectively transmit, or to reflect, light in different frequency ranges. Thus, when formed from an optical interference filter, coating 116 can be designed to transmit infrared light or undesirable colors of visible light, for instance. This is accomplished by selecting layer thicknesses and layer count for a given set of high and low index of refraction materials, a routine matter in the art.

Visible light-reflecting coating 116, alternatively, may comprise a diffuse reflective coating, formed, for instance, from any of alumina, magnesia, or titania.

Arc tube 114 contains, within a sealed volume, an ionizable fill (not shown), which is electromagnetically excited by radio frequency (r.f.) current in coil 112 to produce an arc discharge (not shown) in the arc tube. The ionizable fill may comprise, for instance, a sodium halide, a cerium halide, and xenon combined in weight proportions to generate visible radiation exhibiting high efficacy and good color-rendering capability at white color temperatures. Another suitable fill comprises a combination of a lanthanum halide, a sodium halide, a cerium halide and xenon or krypton as a buffer gas. Further details of a suitable fill are mentioned in U.S. Pat. No. 4,972,120 issued to H. L. Witting on Nov. 20, 1990, which is assigned to the instant assignee and incorporated herein by reference.

In the illustrated embodiment, coil 112 essentially acts as the primary winding of an electrical transformer, with the arc discharge within arc tube 114 being the single-turn secondary winding of such transformer. R.F. current in coil 112 produces a time-varying magnetic field, which, in turn, creates an electric field in the ionizable fill that closes completely upon itself so as to form a solenoidal electric field. Current flowing as a result of such solenoidal electric field induces a toroidal, or ring-shaped, arc discharge in the arc tube.

As alternatives to using excitation coil 112 to induce an arc discharge in arc tube 114, a capacitive coupling or microwave radiation could be used, for instance.

In the embodiment shown, the illustrated HID lamp 110 includes an exemplary starting aid 118 comprising a gas probe. Gas probe 118 contains, in a sealed volume, a respective ionizable fill, such as krypton. Gas probe 118 helps start the main arc discharge within arc tube 114 when it receives electrical energy via, for instance, a capacitively coupled sleeve 120. Further details of a gas probe starting aid are mentioned in U.S. Pat. No. 5,140,227 of J. T. Dakin et al., issued on Aug. 18, 1992, assigned to the present assignee and incorporated herein by reference.

Figure 1B:
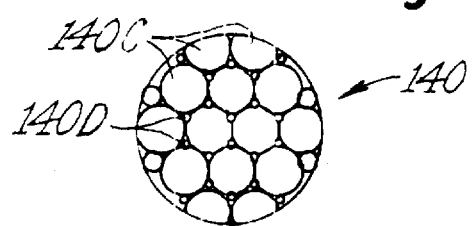
FIG. 1B shows, in reduced size, a terminal end of a light guide comprising a bundle of individual light guide members that receives light from the HID lamp of FIG. 1A.

Coupling arrangement 100 includes a hollow coupling device 130, for optically coupling HID lamp 110 to a light guide, generally designated 140. Visible light-reflecting coating 116 helps maximize extraction of light from lamp 110 to coupling device 130. Light guide 140 may, as shown, comprise a bundle of respective light guide members 140A, 140B, etc., each of which may comprise, for instance, known plastic or glass light guides. The individual light guide members 140A, 140B, etc. are preferably contained within the lower-shown hollow end of coupling device 130. Light guide members 140A, 140B, etc. are preferably of various sizes, as shown in FIG. 1, and are preferably slightly compacted, as best shown in FIG. 1B. The use of differently sized light guide members and their compaction at their terminal end 140C minimizes gaps between adjacent light guide members, such as shown at 140D in FIG. 1B. Such gaps (e.g. 140D) waste light received from HID lamp 110. In conventional manner, each of light guide members 140A, 140B, etc. distributes the light it receives from a lamp to one or more distant locations.

Hollow coupling device 130 preferably comprises a hollow dielectric member, such as fused quartz with a typical wall thickness of 1.5 millimeters. An inlet end 130A of coupling device 130 receives light from arc tube 114. Inlet end 130A has a typical maximum diameter of 31 millimeters, and is typically spaced by a clearance 132 from arc tube 114 of about 1 millimeter; such dimensions being exemplary values only and not intended to limit the scope of the present invention. Coupling device 130 receives light from HID lamp 110 at one solid angle over a first area at inlet end 130A, and transmits such light at a smaller solid angle and over a larger area at coupling outlet end 130B, this operation being referred to as an angle-to-area conversion. Coupling device 130 is preferably shaped to define a so-called compound parabolic concentrator (CPC), for performing the foregoing angle-to-area conversion. CPCs are described in detail in, for instance, W. T. Welford and R. Winston, *High Collection Nonimaging Optics*, New York: Academic Press, Inc. (1989), chapter 4 (pp. 53–76). Such angle-to-area conversion can be accomplished using a coupling device of other shapes, such as conical, as will be apparent to those skilled in the art.

To assist coupling device 130 in transferring light from the lamp to the light guide, the interior (or exterior) surface of coupling device 130 is covered with a visible light-reflecting coming 150 which is effective for reflecting light inwardly of coupling device 130. Coating 150 preferably comprises a filter formed in the same manner as the preferred visible-light reflecting coating 116, described above. As such, coating 150 enjoys the refractory and dielectric properties mentioned above for coating 116.

Hollow coupling device 130 can be configured with a length exceeding e.g., 20 centimeters, so as to minimize thermal transfer from arc tube 114 to light guide 140. This value is exemplary only; other values could be used as well. It need only be understood that the spatial separation is determined according to the size of the arc tube and discharge formed therein and that the length of coupler member 130 should be on the order of four times or larger, the diameter of arc tube 114. Such thermal isolation protects terminating ends 140C of light guide 140 from thermal damage, especially where light guide 140 is comprised of plastic material. Such thermal isolation, additionally, prevents light guide 140 from extracting significant heat from lamp 110, which would result in a significantly asymmetric thermal profile of arc tube 114, and would seriously degrade lamp performance. When comprised of an optical interference filter, light-reflecting coating 150, on coupling device 130, may beneficially be transmissive to a substantial portion of the spectrum of infrared light, so as to allow heat to escape through the walls of coupling device 130; the length of device 130 can thereby be minimized.

Figure 1C:
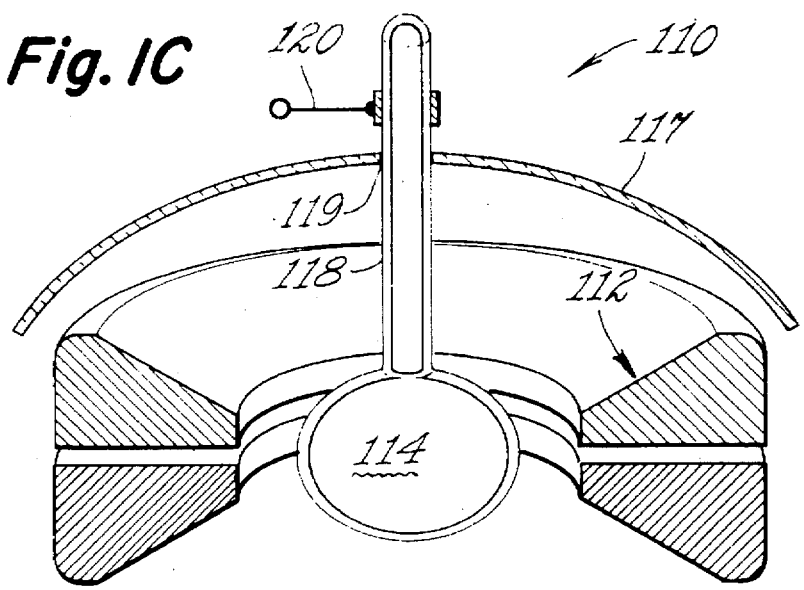
FIG. 1C shows an alternative HID lamp utilizing a generally spherical mirror to re-orient, in a downward direction, light that emanates upwardly from an arc tube of the lamp, and which can be used in the lamp-to-light guide coupling arrangement of FIG. 1A.

FIG. 1C shows an HID lamp 110 employing a generally spherical mirror 117, as an alternative to light-reflecting coating 116 on arc tube 114 of FIG. 1A. Mirror 117 receives light from arc tube 114 and reflects such light downwardly towards coupling device 130 (FIG. 1). As shown, gas probe 118 may extend through an aperture 119 in mirror 117. If desired, mirror 117 can be mounted on gas probe 118. Mirror 117 can be used as an alternative to the light-reflecting coatings on an arc tube for the other embodiments of the invention, described below.

Figure 1D:
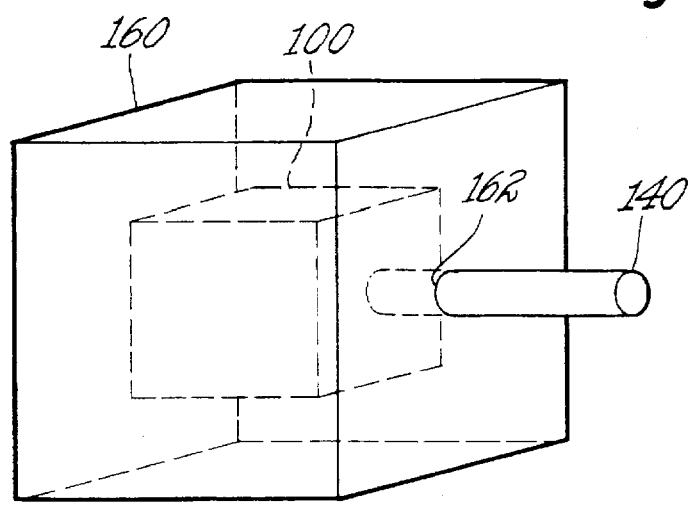
FIG. 1D is a simplified perspective view of an electrically conductive enclosure containing a lamp-to-light guide coupling arrangement for an electrodeless HID lamp, in accordance with an aspect of the invention.

As schematically illustrated in FIG. 1D, lamp-to-light guide coupling arrangement 100, as well as its associated circuitry (not shown), may beneficially be contained within an electrically conductive enclosure 160. Such electrically conductive enclosure 160 substantially confines to within the enclosure r.f. radiation causing electromagnetic interference (EMI), which is generated by lamp-to-light guide coupling arrangement 100 and its associated circuitry. Enclosure 160 has an aperture 162 through which light guide 140 passes, to permit light distribution. Aperture 162 is preferably sized small enough to render negligible any EMI that escapes through aperture 162. Preferably, such aperture is sized below about 1/10 of a wavelength of electromagnetic energy of the excitation means (e.g. coil 112).

Figures 2A, 2B:
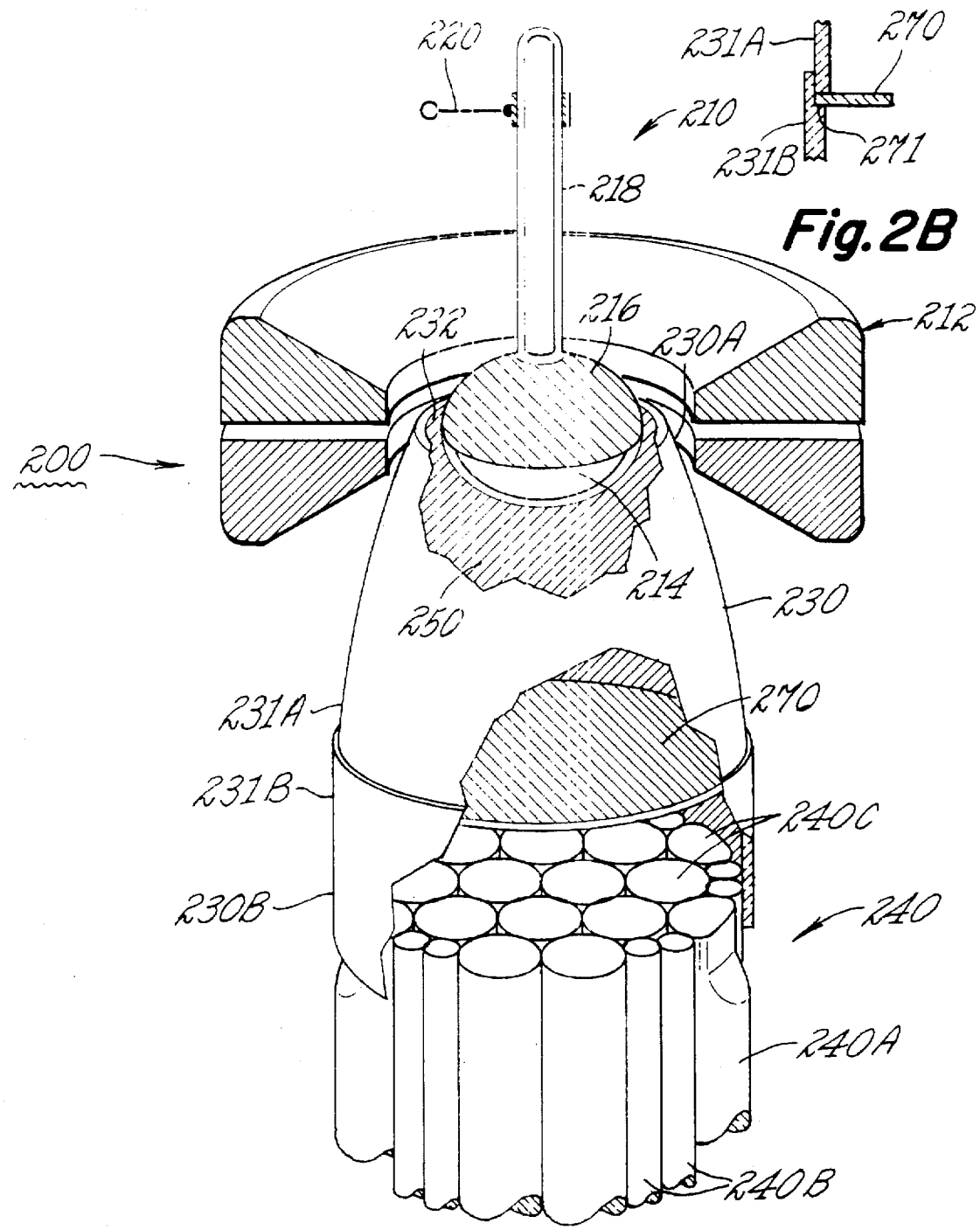
FIG. 2A is perspective view, partially cut away, of a lamp-to-light guide coupling arrangement that includes means for reflecting non-visible light, such as infrared or ultra-violet radiation, back towards a high intensity discharge lamp.
FIG. 2B is a detail view of FIG. 2A, showing how a non-visible light-reflecting means may be positioned between upper and lower portions of a coupling device.

In FIG. 2A, a further lamp-to-light guide coupling arrangement 200 is shown. Like parts as between coupling arrangement 200 and coupling arrangement 100 of FIG. 1A are indicated by reference numerals having common digits apart from the initial numeral. Thus, HID lamp 210 in FIG. 2A. conforms to the above description of HID lamp 110 of FIG. 1A.

Coupling arrangement 200 of FIG. 2A differs from coupling arrangement 100 of FIG. 1A by including a filtering means 270 for removing or returning towards HID lamp 210 one or both of infrared and ultra-violet radiation. This further aids in thermally isolating arc tube 214 from light guide 240 and prevents damage to the fiber ends as may otherwise result from exposure to UV or IR radiation.

Filtering means 270 may comprise, for instance, a flat quartz disk that is coated with an optical interference coating; such coating may be on both sides of the disk, and is preferably formed in the same general manner as the light-reflecting coating 116, described above. As best shown in FIG. 2B, filtering means 270 may be placed between upper coupling device portion 231A and a "ledge" 271 of lower coupling device portion 231B. FIG. 2B also shows upper coupling device portion 231A received within lower coupling device 231B, one convenient way to connect such portions.

Figure 3:
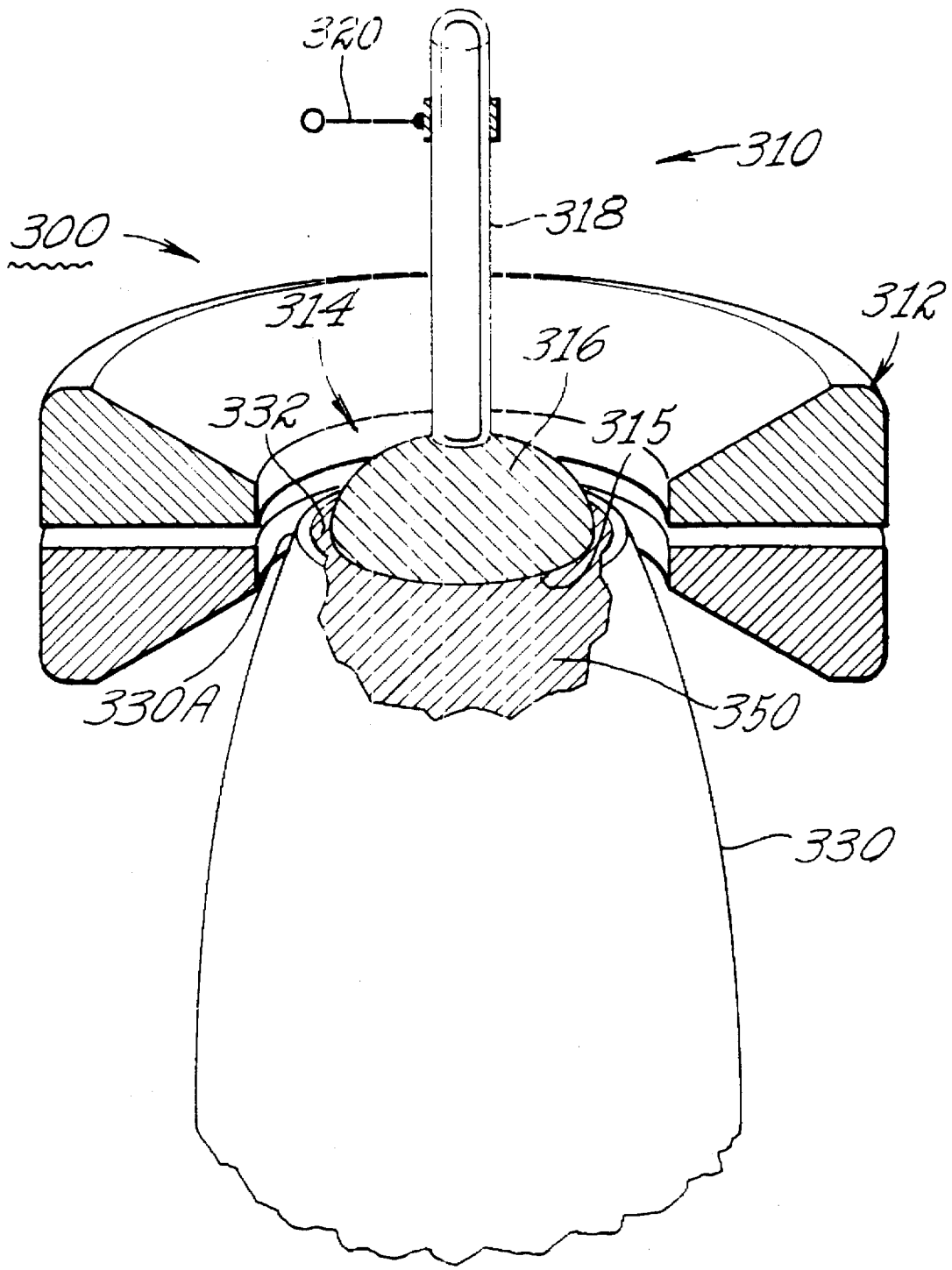
FIG. 3 is a perspective view, partially cut away, of a portion of a lamp-to-light guide coupling arrangement wherein an HID lamp employs an arc tube having a flat surface through which light is extracted.

FIG. 3 shows another lamp-to-light guide coupling arrangement 300, wherein arc tube 314 has a substantially flat bottom 315. Light distribution from arc tube 314 is improved with the flat bottom.

Figure 4:
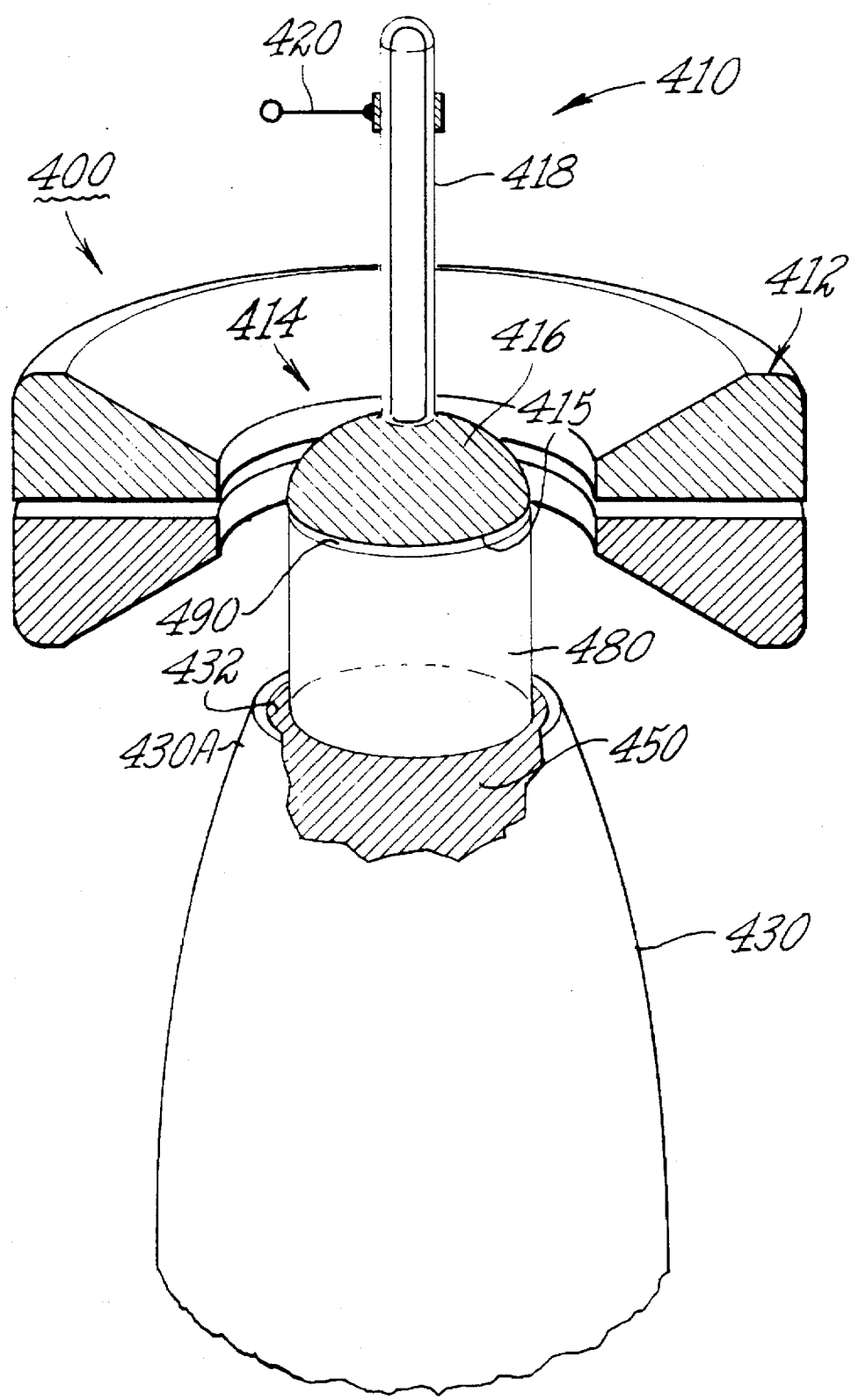
FIG. 4 is a perspective view of a portion of a lamp-to-light guide coupling arrangement, similar to FIG. 3 with regard to employing an arc tube with a flat window for light extraction, and additionally employing an intermediate solid refractory tube for transmitting light from such flat window to a hollow coupling device of the arrangement.

FIG. 4 shows a further lamp-to-light guide coupling arrangement 400 employing an arc tube 400 with a flat bottom 415. Coupling arrangement 400 additionally includes an intermediate refractory rod 480, which is formed from fused quartz, for instance. Refractory rod 480 has a lower end received within coupling device inlet end 430A. Refractory rod 480 has an upper end spaced in close proximity to flat window 415, but preferably separated from the window by a thermally isolating gap 490.

Intermediate refractory rod 480 serves to further thermally isolate HID lamp 410 from light guides (not shown in this figure). This relaxes the thermal design requirements for the "downstream" light distribution components, e.g. coupling device 430.

From the foregoing, it will be appreciated that the present invention provides a lamp-to-light guide coupling arrangement for an electrodeless HID lamp which transmits a substantial portion of the lamp's light to the light guide, in an optically efficient manner. The coupling arrangement preferably employs dielectric material, so as to avoid short circuit currents that could potentially destroy the coupling arrangement, or interfere with lamp operation. Light is extracted from the lamp with only a minimal drain of thermal energy from the lamp, so as to prevent the lamp from having a significant asymmetric thermal profile, which would impair the lamp operation. Heating of the light guide is minimized in various ways, e.g., by using a hollow coupling device, by adjusting the length of such coupling device, and, if desired, by making the visible light-reflecting coating on the coupling device transmissive to infrared light.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

For example, it would be possible to eliminate reflective coating 116 from arc tube 114 and dispose a second optical coupler similar to 130 on the other side of the arc tube 114. For the second collector, the starting probe 118 could extend through the center or be moved to a position angled away from the axis of the coupler, yet still not get in the way of the coil 112. In such an example, the startup probe can extend through an opening formed in the side of the coupler.

What is claimed is:

1. A lamp-to-light guide coupling arrangement for an electrodeless discharge lamp having an arc tube containing an ionizable fill which is excitable so as to produce a light generating arc discharge and has associated therewith, certain thermal and electrical operating properties, said coupling arrangement comprising:

(a) a coupling device disposed in close proximity to said discharge lamp and being of a generally tubular, hollow construction having an inlet end for receiving light from said arc discharge and a larger, output end, said inlet end having an area which is substantially the same as a cross sectional area of said discharge lamp and said larger output end having a diameter which is approximately 2 to 3 times the diameter of said discharge lamp;

(b) reflector means disposed on at least a portion of a surface of said hollow coupling device and being effective for reflecting light interiorly of said coupling device;

(c) wherein said coupling device is shaped so as to receive light at one solid angle over an area of said inlet end and to transmit light through said outlet end at a smaller angle but over a larger area of said outlet end;

(d) at least one light guide coupled to said outlet end of said coupling device; and, (e) wherein said coupling device with said reflector means being disposed thereon, is effective so that, when in such close proximity to said discharge lamp, the thermal and operating properties of said discharge lamp remain substantially unaffected by said coupling device.

2. The lamp-to-light guide arrangement of claim 1, wherein said coupling device is formed from dielectric material.

3. The lamp-to-light guide coupling arrangement of claim 1, wherein said coupling device is shaped so as to define a compound parabolic concentrator.

4. The lamp-to-light guide coupling arrangement of claim 1, wherein said at least one light guide is disposed within said outlet end of said coupling device.

5. The lamp-to-light guide coupling arrangement of claim 1, wherein said reflector means includes electrically non-conductive an optical interference filter transmissive of a substantial portion of the spectrum of infrared light, so as to allow heat from said lamp to escape through said coupling device.

6. The lamp-to-light guide coupling arrangement of claim 1, in combination with an electrically conductive enclosure for enclosing said lamp-to-light guide coupling arrangement, whereby electromagnetic interference resulting from operation of said lamp is substantially confined to within said enclosure.

7. The lamp-to-light guide coupling arrangement of claim 1, further comprising a reflecting member positioned within said coupling device between said lamp and said at least one light guide, for returning towards said lamp, radiation comprising at least one of infrared and ultraviolet radiation.

8. The lamp-to-light guide coupling arrangement of claim 1, wherein a light-transmitting side of said arc tube of said lamp is received within said inlet end of said hollow coupling device.

9. The lamp-to-light guide coupling arrangement of claim 8, wherein said light transmitting side of said arc tube comprises a flat surface.

10. The lamp-to-light guide coupling arrangement of claim 1, further comprising an intermediate, light-transmissive refractory rod positioned between said arc tube of said lamp and said hollow coupling device, being effective so as to thermally isolate said at least one light guide from said lamp.

11. The lamp-to-light guide coupling arrangement of claim 1, further comprising a mirror member receptive of light from said arc discharge through a first surface of said arc tube, and effective so as to reflect such light back through said one side and towards another surface of said arc tube.

12. A light distribution arrangement for transmitting light output from an electrodeless high intensity discharge lamp to at least one remote location, said light distribution arrangement comprising:

(a) said electrodeless high intensity discharge lamp including an arc tube with an ionizable fill;

(b) an excitation coil surrounding said arc tube for electromagnetically exciting said ionizable fill to induce therein a light-producing arc discharge;

(c) a coupling device comprising:
  (i) a generally tubular body having an inlet end for receiving light from said arc discharge and a larger, outlet end;
  (ii) wherein said coupling device is solid in construction and has total internal reflectance properties associated therewith, said total internal reflectance properties being achieved without the use of an electrically conducting material;
  (iii) said coupling device being shaped so as to receive light at one solid angle over an area of said inlet end and to transmit light at a smaller solid angle but over a larger area of said outlet end; and (d) at least one light guide coupled to said outlet end of said coupling device.

13. The light distribution arrangement of claim 12, wherein said coupling device is formed from dielectric material.

14. The light distribution arrangement of claim 12, wherein said coupling device is shaped so as to define a compound parabolic concentrator.

15. The light distribution arrangement of claim 12, further comprising an intermediate, light-transmissive refractory rod positioned between said arc tube of said lamp and said coupling device so as to further thermally isolate said at least one light guide from said lamp.

16. The light distribution arrangement of claim 15, wherein said light transmitting side of said arc tube comprises a flat surface spaced in close proximity to an end of said refractory rod.

* * * * *